UNITED STATES PATENT OFFICE

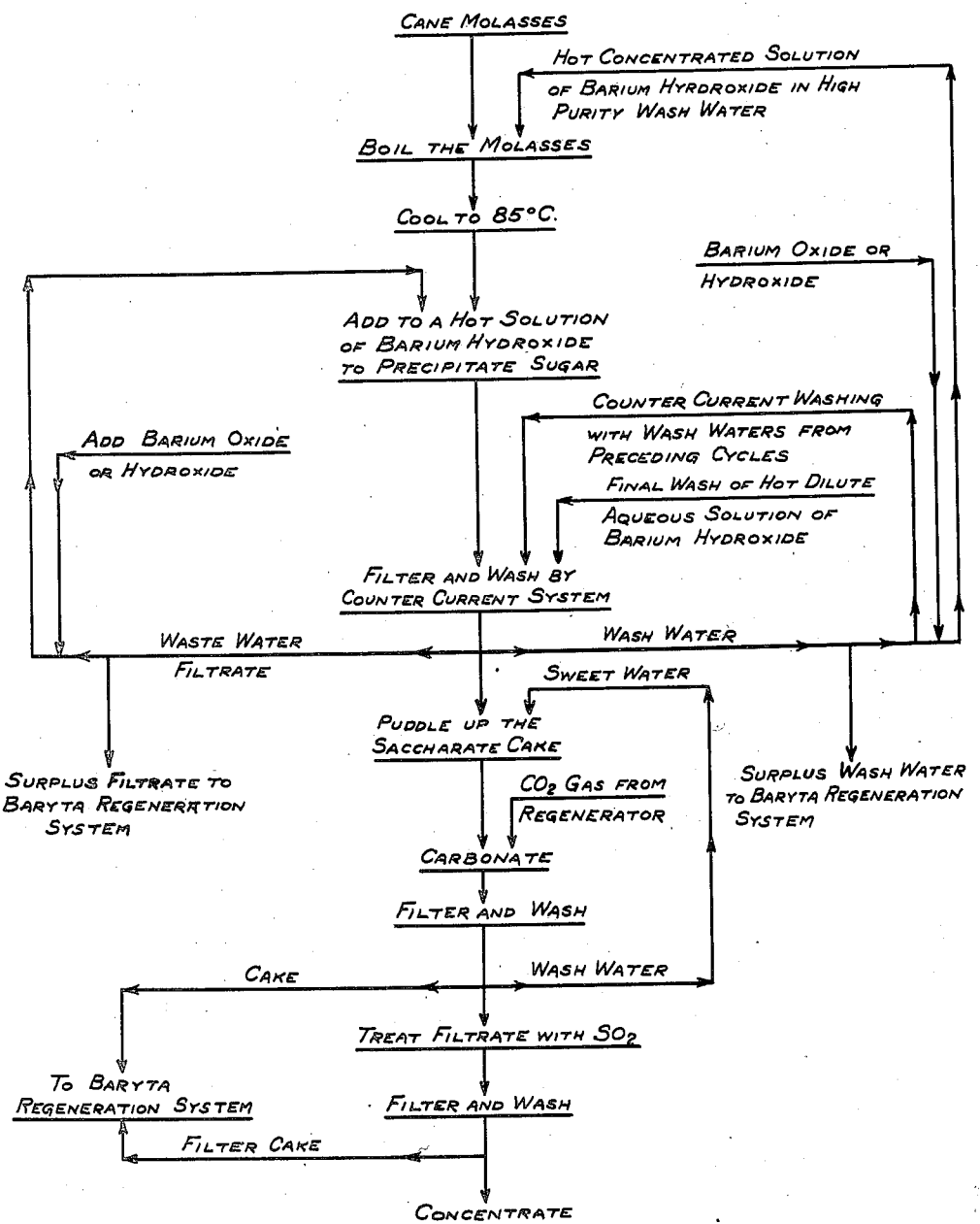

ALFRED L. HOLVEN, OF CROCKETT, CALIFORNIA

RECOVERY OF SUCROSE FROM CANE MOLASSES

Application filed August 21, 1929. Serial No. 387,393.

My invention relates particularly to the extraction of sucrose from molasses which also contains dextrose, levulose, or other reducing sugars which ordinarily interfere with the precipitation of the sucrose in the form of a saccharate of an alkaline earth metal.

The principal objects of this invention consist of an improved method of eliminating reducing sugars without a resulting loss of sucrose, and improvements in the precipitation and purification of barium saccharate in order that substantially all of the sucrose can be recovered from cane molasses in a relatively pure form.

The sucrose in beet molasses can be readily recovered by processes wherein the sucrose is precipitated as either calcium saccharate or barium saccharate. The applications of similar processes to cane molasses, however, have met with failure because of the interfering effect of reducing sugars which decompose to form impurities which not only interfere with the precipitation of barium saccharate, but also contaminate the precipitated barium saccharate.

Other investigators such as Camille Deguide in German Patent No. 395,563, and United States Patent No. 1,579,090, and Guilford Spencer in United States Patent No. 1,646,323, have endeavored to eliminate reducing sugars from cane molasses by the addition of either barium hydroxide or barium silicate to the heated and diluted molasses prior to the precipitation of the sucrose therefrom. Difficulties have been encountered in the application of these processes, however, as considerable sucrose is lost either through decomposition or precipitation in the early stages of the process.

The present invention is based upon the discovery that the conversion of reducing sugars to acids such as saccharic, lactic, and formic, and the precipitation of barium saccharate, and the decomposition of the barium saccharate to liberate the sucrose therefrom in a practically pure form, are well defined functions of the hydroxyl ion concentrations and temperature. By maintenance of the hydroxyl ion concentration and the temperature at the proper value for each phase of the process as described below, it is possible by this process to effectively eliminate the reducing sugars from molasses, and subsequently recover the sucrose therefrom in a relatively pure form. This invention is also illustrated by way of example in the accompanying diagram which shows a flow plan indicating the various steps of the process.

The molasses to be desugarized is heated to an approximately boiling temperature, and to this hot molasses there is slowly added with continuous agitation a relatively concentrated solution of barium hydroxide.

The barium hydroxide used in this step may be dissolved in water, but is preferably made up in the high purity wash waters from a previous cycle of operations. As such wash waters already contain barium hydroxide and sucrose, economies in both reagent and sucrose recovery are achieved by their use.

The solution of barium hydroxide is added to the molasses either continuously or in increments at such a rate that the hydroxyl ion concentration of the resulting mixture is between pH 10.0 and pH 11.00. In order to prevent an undesirable precipitation of sucrose at this stage, it is imperative that the hydroxyl ion concentration be maintained below pH 11.00. During the period that reducing sugars are being eliminated, acid bodies are being formed and it is therefore necessary to continuously add barium hydroxide in order to maintain the molasses at an alkalinity above pH 10.0.

This hot alkaline defecation is continued for a sufficient period of time to lower the reducing sugar content to a point where it will no longer constitute an interfering factor in the subsequent precipitation of the sucrose. The continuance of the defecation for a period of from 20 to 40 minutes will usually be sufficient.

The molasses from which reducing sugars have been eliminated by defecation is treated, at a temperature of between 80° C. and 90° C., with a sufficient quantity of baryta solution to increase its hydroxyl ion concentration to approximately pH 12.5, which is the alkalinity at which the precipitation of sucrose as barium saccharate will be completed. The quantity of barium hydroxide required for this purpose will be equivalent to about 65% BaO on the weight of sucrose present in the defecated molasses. The solution of barium hydroxide used as a precipitating reagent may be made up with water, but is preferably prepared by the addition of the required quantity of barium hydroxide to the waste water filtrate (mother liquor) from a corresponding stage of a previous cycle of operations. The use of mother liquor rather than water in the preparation of this barium hydroxide solution not only increases the sucrose extraction, as this solution is already saturated with barium saccharate, but also reduces the amount of reagent to be added as the highly alkaline mother liquor from this step contains considerable barium hydroxide which is available for the precipitation of sucrose.

The precipitated barium saccharate is a heavy pasty mass which is difficult to filter. The addition of a suitable quantity of waste water (mother liquor) to this product, however, will reduce its consistency to the extent that it can be readily filtered on the usual types of continuous vacuum filters. The use of waste water for this purpose is desirable, as it dilutes the saccharate paste without redissolving any of the precipitated saccharate, and without decreasing the purity of the saccharate.

The precipitated barium saccharate is recovered by filtration, and the resulting impure filtrate of waste water is removed therefrom by washing the precipitated barium saccharate with a dilute solution of barium hydroxide in which the solubility of barium saccharate is comparatively low.

The barium saccharate cake may be washed upon the filter according to customary methods, but it may be more economically accomplished in a counter current system whereein the saccharate cake is successively washed with a series of wash waters derived from a previous cycle of saccharate washing, and which are of progressively higher purities, and are slightly higher in purity than the cake to which they are applied. Such a system of washing has the following advantages: a decrease in the amount of wash water, with a resulting decrease in the amount of sweetwater to be concentrated; a decrease in the amount of barium hydroxide normally added to the wash waters; and an increased extraction of sucrose.

The washed filter cake of barium saccharate is puddled up with hot water to a consistency suitable for treatment with carbon dioxide gas. The suspension of barium saccharate in water is then treated with carbon dioxide gas which liberates the sucrose and precipitates the barium as barium carbonate. It has been found that the extraction, purity and color of the resulting sucrose solution is fundamentally dependent on the hydroxyl ion concentration to which the carbonation reaction is carried. In order to insure complete decomposition of the barium saccharate, it is advisable to reduce the hydroxyl ion concentration to pH 10.5 or lower. At hydroxyl ion concentration below pH 9.5, however, certain impurities occluded in the saccharate cake become soluble and will contaminate the saccharate liquor. In order to secure a sugar solution of maximum purity, and minimum color from the barium saccharate, it is essential that the carbonation reaction be continued only until the hydroxyl ion concentration is reduced to between pH 9.5 and pH 10.5.

The carbonated solution is filtered for the removal of the insoluble barium carbonate and the recovery of the sucrose in the form of a high purity saccharate liquor. The filter cake of barium carbonate, after being washed free of sucrose, is treated in a suitable manner for its conversion to barium hydroxide.

In order to eliminate soluble barium salts and reduce its color, the filtrate is acidified, that is the pH value is reduced, to between pH 6.50 and pH 7.00 by treatment with sulphur dioxide gas. The liquor which has thus been treated with sulphur dioxide gas, from which the barium and certain other impurities have been precipitated, is filtered, and the filtrate is treated in the usual manner for the recovery of sucrose therefrom by direct crystallization.

Having thus described my invention, what I claim and desire to secure by Letters Patent is—

1. In the process for the recovery of sucrose from cane molasses, the steps which consist in the dissolving of barium hydroxide in the mother liquor resulting from a molasses from which an alkaline earth saccharate has been precipitated, and the mixing of said solution with defecated molasses for the purpose of precipitating the sucrose from the molasses in the form of barium saccharate.

2. In the process for the recovery of sucrose from cane molasses, the step which consists in the dilution of an unwashed barium saccharate precipitate with mother liquor from which an alkaline earth saccharate has been precipitated, whereby in diluting the precipitate to such a consistency that it can be readily filtered on continuous filters a redissolving of the barium saccharate is prevented.

3. The method of recovering sucrose from molasses which comprises heating the molasses to boiling temperature, adding an alkaline earth hydroxide sufficient to destroy the reducing sugars but insufficient to precipitate the sucrose, then without filtering off the precipitated impurities adding a concentrated solution of waste water containing barium hydroxide from a previous operation to further increase the alkalinity to precipitate the sucrose as a saccharate, filtering and washing the saccharate, carbonating the saccharate at a hydroxyl ion concentration above which the precipitated impurities will redissolve, filtering and then treating with sulphur dioxide to reduce color and precipitate barium salts, and finally filtering and subjecting the saccharate liquor to evaporation to recover the sucrose.

4. In the process for the recovery of sucrose from cane molasses, the improvement which consists in the defecation of a hot molasses solution between rigidly controlled limits of hydroxyl ion concentration by adding a concentrated solution of barium hydroxide in high purity wash water from a previous cycle to eliminate reducing sugars without precipitating sucrose, then without filtering off the precipitated impurities, precipitating the sucrose as a saccharate by the addition of a hot solution of barium hydroxide in mother liquor from a previous cycle, and carbonating the final product at a hydroxyl ion concentration above which the precipitated impurities redissolve.

5. In the process for the recovery of sucrose from cane molasses, the improvement which consists in the defecation of a hot molasses solution between rigidly controlled limits of hydroxyl ion concentration by adding a concentrated solution of barium hydroxide to eliminate reducing sugars without precipitating sucrose, then without filtering off the precipitated impurities, precipitating the sucrose as a saccharate by the addition of a hot solution of barium hydroxide in mother liquor from a previous cycle while maintaining the hydroxyl ion concentration above that at which the solid impurities redissolve, filtering said saccharate, diluting the saccharate with sweet water from a previous cycle and finally subjecting the diluted saccharate to carbonation and filtration before crystallizing the recovered sucrose by evaporation of the saccharate liquor.

ALFRED L. HOLVEN.